(12) United States Patent
Ferguson

(10) Patent No.: US 9,336,596 B2
(45) Date of Patent: May 10, 2016

(54) SYSTEM AND METHODS TO EFFICIENTLY MEASURE STEREOSCOPIC DISPARITY AND TO GENERATE RELATED MISMATCH IMAGES

(75) Inventor: Kevin M. Ferguson, Beaverton, OR (US)

(73) Assignee: TEKTRONIX, INC., Beaverton, OR (US)

( * ) Notice: Subject to any disclaimer, the term of this patent is extended or adjusted under 35 U.S.C. 154(b) by 1123 days.

(21) Appl. No.: 13/004,124

(22) Filed: Jan. 11, 2011

(65) Prior Publication Data

US 2012/0162364 A1    Jun. 28, 2012

Related U.S. Application Data

(60) Provisional application No. 61/427,743, filed on Dec. 28, 2010.

(51) Int. Cl.
| | |
|---|---|
| *H04N 7/18* | (2006.01) |
| *G06T 7/00* | (2006.01) |
| *G06T 5/00* | (2006.01) |
| *H04N 13/00* | (2006.01) |

(52) U.S. Cl.
CPC .............. *G06T 7/0022* (2013.01); *G06T 5/004* (2013.01); *G06T 2207/10021* (2013.01); *H04N 2013/0081* (2013.01)

(58) Field of Classification Search
CPC ................... H04N 13/0055; H04N 19/00769; H04N 13/0239
USPC ..................................................... 348/42–60
See application file for complete search history.

(56) References Cited

U.S. PATENT DOCUMENTS

| | | | |
|---|---|---|---|
| 5,444,478 A * | 8/1995 | Lelong et al. .................... | 348/39 |
| 6,031,940 A * | 2/2000 | Chui et al. ...................... | 382/240 |
| 8,487,982 B2 * | 7/2013 | Lipton et al. .................... | 348/43 |
| 8,576,141 B2 * | 11/2013 | Takada et al. ...................... | 345/6 |
| 2009/0041336 A1 | 2/2009 | Ku et al. | |

FOREIGN PATENT DOCUMENTS

| | | |
|---|---|---|
| WO | 03036992 A1 | 5/2003 |
| WO | 2010015957 A1 | 2/2010 |

OTHER PUBLICATIONS

European Search Report dated Apr. 24, 2013 for Application No. 11189904.3, 9 pages.

(Continued)

*Primary Examiner* — Andy Rao
(74) *Attorney, Agent, or Firm* — Michael A. Nelson; Marger Johnson

(57) ABSTRACT

Embodiments of the invention include a system and methods for measuring disparity and mismatch of stereoscopic images of three-dimensional video, which may indicate a level of discomfort on the part of the viewer. Measuring these parameters may also be used to give an indication that certain processes have or have not adversely effected perceived depth (i.e. through conversion from disparity to depth given a display size and viewing distance), verify camera setup or 2-dimension to 3-dimension synthesizing processes. Generating the indications and other data about the stereoscopic images uses techniques that allow processing with much less computing resources than was possible in previous systems.

20 Claims, 8 Drawing Sheets

(56) References Cited

OTHER PUBLICATIONS

Boev A., et al., "Towards compound stereo-video quality metric: a specific encoder-based framework," Image Analysis and Intepretation, 2006 IEEE Southwest Symposium, Denver, CO, Mar. 26-28, 2006, pp. 218-222.

Scharstein D., et al., "A taxonomy and evaluation of dense two-frame stereo correspondence algorithms," Stereo and Multi-baseline Vision, 2001. (SMBV 2001). Proceedings, IEEE Workshop on Kauai, HI, Dec. 9-10, 2001.

European Search Report, Jul. 9, 2015, EP 15167198.9, 10 pp.

* cited by examiner

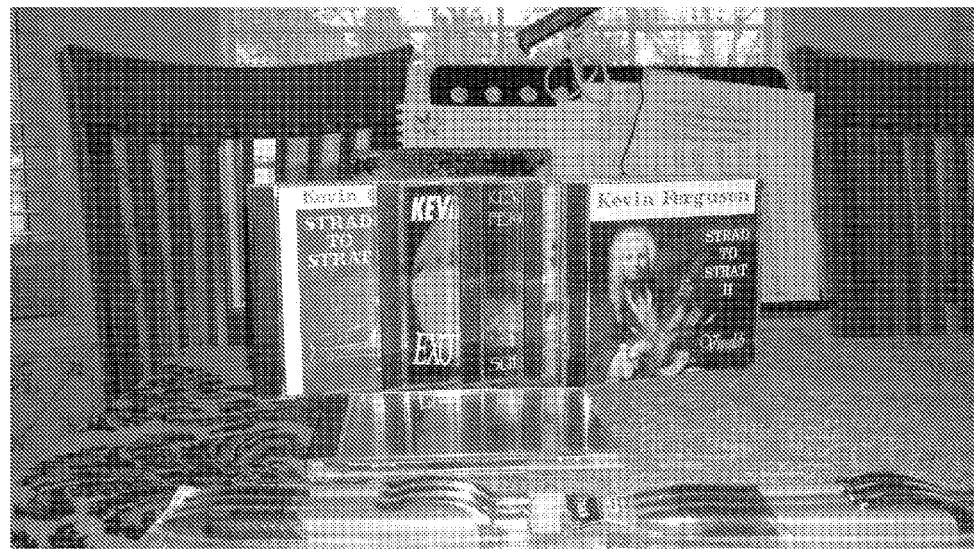
FIG. 2A (left image)
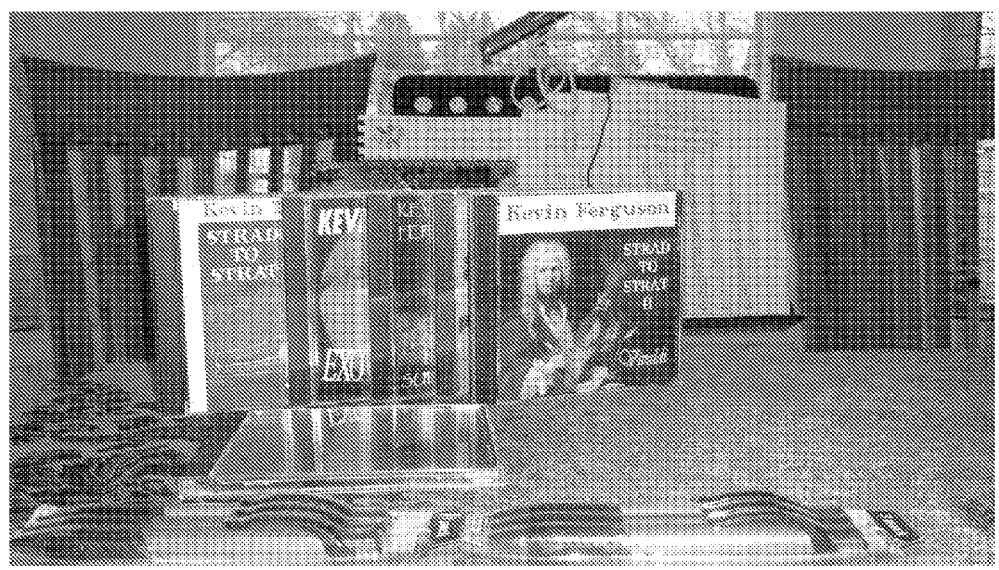
FIG. 2B (right image)

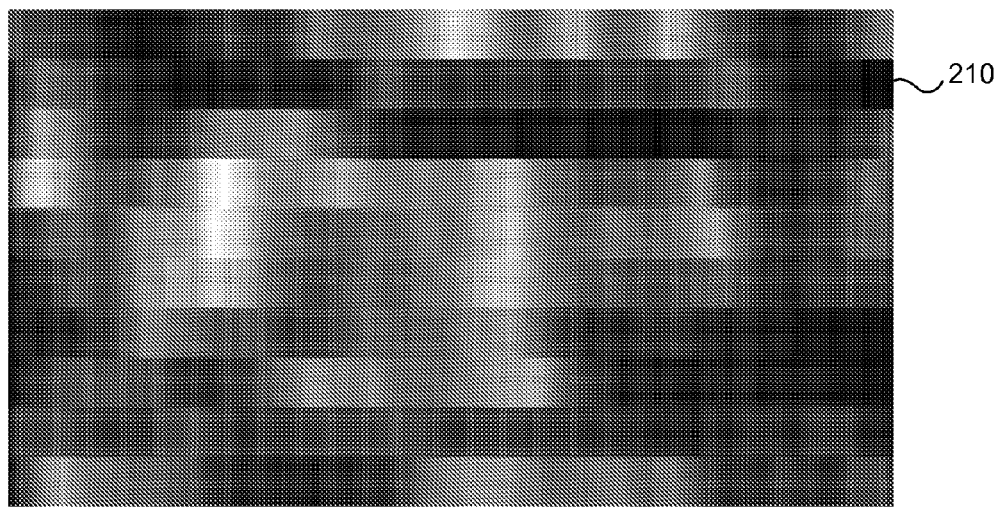
FIG. 11    Mismatch Image
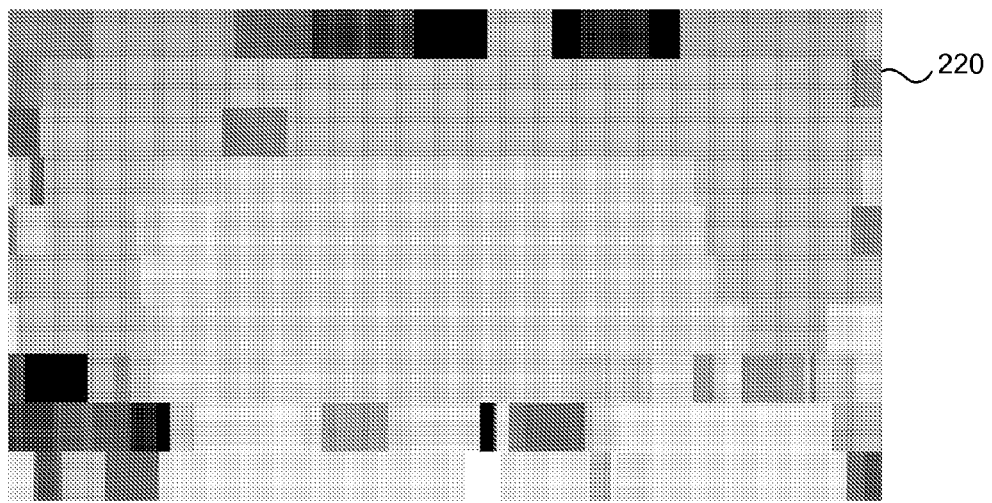
FIG. 12    Disparity Image

SYSTEM AND METHODS TO EFFICIENTLY MEASURE STEREOSCOPIC DISPARITY AND TO GENERATE RELATED MISMATCH IMAGES

CROSS-REFERENCE TO RELATED APPLICATIONS

This application claims the benefit of U.S. Provisional Patent Application No. 61/427,743 titled "System and Methods to Efficiently Measure Stereoscopic Disparity and to Generate Related Mismatch Images" which was filed on Dec. 28, 2010.

BACKGROUND

Three-dimensional or stereoscopic video is a proven technology that is in the midst of a renaissance due to improved techniques for simultaneously delivering slightly different images, known as stereoscopic images, to a pair of offset eyes. When each of the left and right eyes view their respective portions of a stereoscopic image having a horizontal disparity, the human brain generates an illusion of depth perception from the disparity. Early stereoscopic cinema relied on different-colored filters worn over each eye to create the depth perception effect, but the overall color of the screen images appeared muted. Newer technology uses polarization filters to separate the images each eye sees. Such techniques are reaching larger audiences because of the widespread adoption of digital projectors in movie theaters, which make it easier to project stereoscopic images than did legacy equipment. With reference to FIG. 1, the mechanics of viewing a stereoscopic image are illustrated in a scene 10. Although the left and right eyes 2, 4, are focused on the same screen 6, filters 12 and 14 use filtering techniques such as those described above, or others, causes each eye to see a slightly different image. The brain then translates spatial, especially horizontal disparity of the same or similar objects in the image as the object having depth, when, in fact, both objects are projected on the same screen 6. There is accordingly a need to accurately measure disparity in stereoscopic images and to convey the measurement to a user in an informative way.

Although there are methods to measure spatial disparity of three-dimensional images, such as those described in a paper "A Taxonomy and Evaluation of Dense Two-Frame Stereo Correspondence Algorithms," by Daniel Scharstein and Richard Szeliski, Microsoft Technical Report MSR-TR-2001-81, available at www.research.microsoft.com, which is referred to as the "Technical Report" and is incorporated by reference herein, they are typically complex and require a large amount of computing power, making them unsatisfactory to use for real-time analysis due to the large expense of processing required.

Embodiments of the invention address these and other limitations in the prior art.

BRIEF DESCRIPTION OF THE DRAWINGS

FIG. 2A is a test image as seen by the left eye and FIG. 2B is the test image as seen by the right eye used in explaining embodiments of the invention. Together they are referred to as a stereoscopic image.

FIG. 11 is a mismatch image created from the generated difference values according to embodiments of the invention.

FIG. 12 is a disparity image created from the generated difference values according to embodiments of the invention.

DETAILED DESCRIPTION

Embodiments of the invention are directed to a system and methods for determining a magnitude of left to right disparity of an image, as well as an indication of potential discomfort of a viewer simultaneously looking at the left and right images. For images having little or no horizontal disparity, the potential discomfort may be determined along the vertical axis.

As enumerated in the above-referenced Technical Report on correspondence algorithms of left/right images, the general processing steps when generating a disparity measurement are: a) quantifying a measurement indicative of spatial matching of portions of the respective images on a local basis; b) aggregating the local results from such quantification; c) disparity computation/optimization; and d) disparity refinement. Embodiments of the invention include each of the major steps to create the correspondence, as well as variations that allow a much better result while using a fraction of the resources of the prior art methods.

Figure 1:
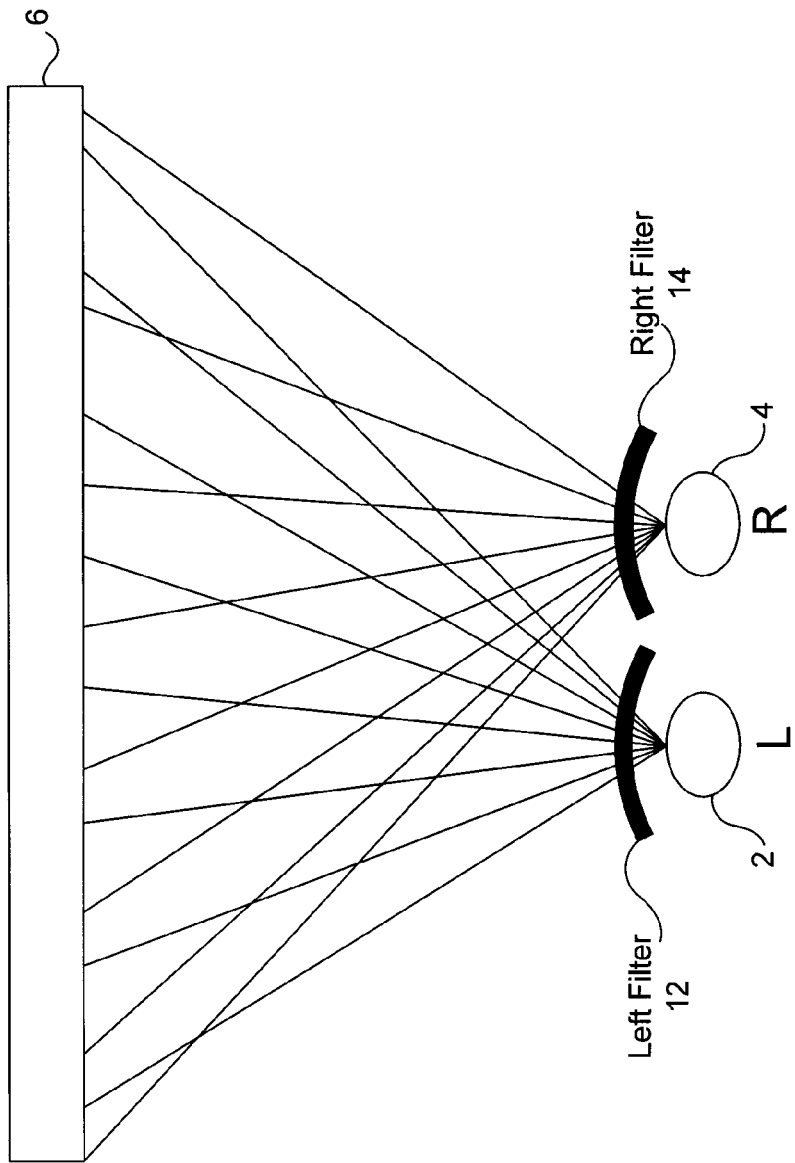
FIG. 1 is a block diagram of a 3D delivery system according to the prior art.
Figure 3:
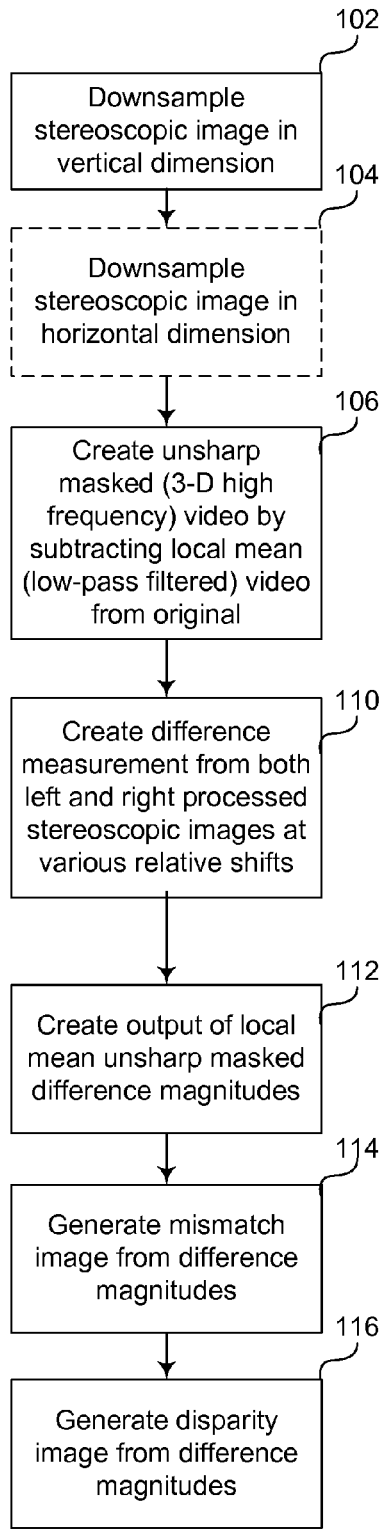
FIG. 3 is a flow diagram of an example method of efficiently measuring stereoscopic disparity according to embodiments of the invention.

Embodiments of the invention may begin with one or more pre-processing steps that modify the images to be compared. With reference to FIGS. 2A, 2B, and FIG. 3, in a preferred embodiment both the left and right images (FIGS. 2A and 2B) of a stereoscopic image are first down-sampled in the vertical direction in a process 102. For example, if the original stereoscopic image is 1080 pixels in the vertical direction and 1920 pixels in the horizontal direction, as a standard HD video frame, each image may be downsampled into a 10×1920 pixel image. This creates a pair of images (left and right) where each image has exactly 10 horizontal lines, each 1920 pixels long. In this example each line represents a combination of the 108 lines of the original stereoscopic image used to make the line, and is referred to as a vertically downsampled image line. Although grayscale images are illustrated, embodiments of the invention work in the color domain as well.

Figure 4:
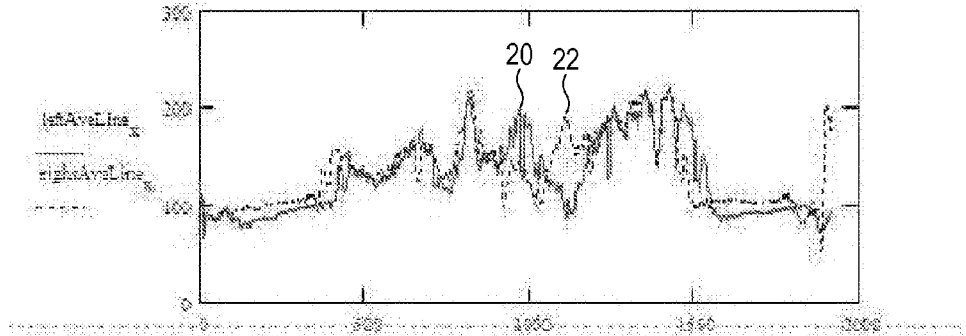
FIGS. 4 and 5 are each graphs of average luminance values of a respective line of a vertically downsampled stereoscopic image from video frames according to embodiments of the invention.
Figure 5:
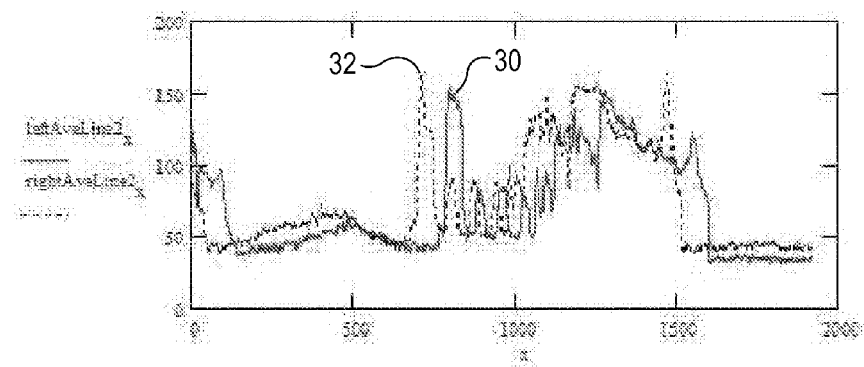

Various techniques can be used to create the vertically downsampled image line from the 108 lines. In one embodiment the first pixel from each of the 108 lines in a section is averaged to create a single mean pixel value. Then the second pixel of all 108 lines is averaged to create the second pixel in the line, and so on, until the vertically downsampled image line of 1920 pixels is created. FIG. 4 is a graph plotting average luminance values for the first vertically downsampled image line in each of FIGS. 2A and 2B, and FIG. 5 is a graph plotting average luminance values for the second vertically downsampled image line of FIGS. 2A and 2B. In FIG. 4 the reference 20 charts the average luminance value for the first vertically downsampled image line from vertically downsampling FIG. 2A from 1080 lines to 10. The reference 22 charts the same value for the downsampled FIG. 2B. Likewise, in FIG. 5 the reference 30 refers to the average luminance value for the second vertically downsampled image line resulting from vertically downsampling FIG. 2A, and reference 32 refers to the same for FIG. 2B.

In another pre-processing procedure, the vertically downsampled image lines, which in this example are 1920 pixels long, may likewise be horizontally downsampled into a shorter line in a process 104 (FIG. 3). This may be appropriate if the display for a monitor for evaluating the stereoscopic images is less than 1920 pixels wide, for instance. Other embodiments may downsample in the horizontal direction so that later processing is performed on fewer pixels, which may be important if computing power is limited. Rather than downsampling a vertically downsampled image line into a specific number of pixels, it may be downsampled by a given percentage, for instance to one having a length of 70% of the original length. Such downsampling is a tradeoff between computing speed of the system vs. accuracy of the overall measurements, however. In some embodiments the vertical and horizontal downsampling factors may be inputs controllable by the user, who may wish to vary such factors until a balance between compute speed and accuracy is achieved.

In some embodiments an anti-alias filter may be used prior to sub-sampling. The selection of which anti-alias filter to use may be determined by available computing resources. For example, if hardware and software resources are readily available, a Seagull filter, such as that described in U.S. Pat. No. 7,406,493 may be used. If instead computational speed is available at a premium, the system may use bi-directional IIR low pass filters described in US Published Application 2008/0152257, entitled "Measurement Apparatus and Method of Measurement of Video Spatial Scale, Offset and Cropping," and US Published application 2010/0226592 entitled "Methods and Systems for Image Registration," both of which are incorporated by reference herein. These bi-directional IIR filters would be used prior to sub-sampling. Another method of computationally efficient downsampling that may be used includes averaging, using similar methods to those described above. Further, if no computing resources are available for anti-alias filtering, aliasing may be forced and the mean representative line from the vertical downsampling described above is simply decimated, and other values are not used. All of the data need not be used in all cases.

Figure 6:
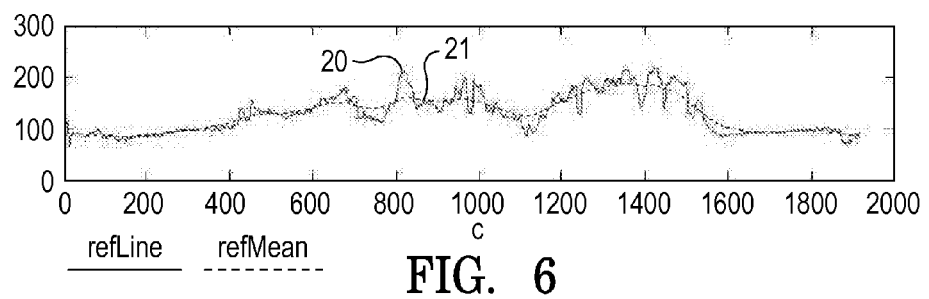
FIG. 6 is a graph of a continuously local mean of the luminance values of the left image illustrated in FIG. 4 according to embodiments of the invention.
Figure 7:
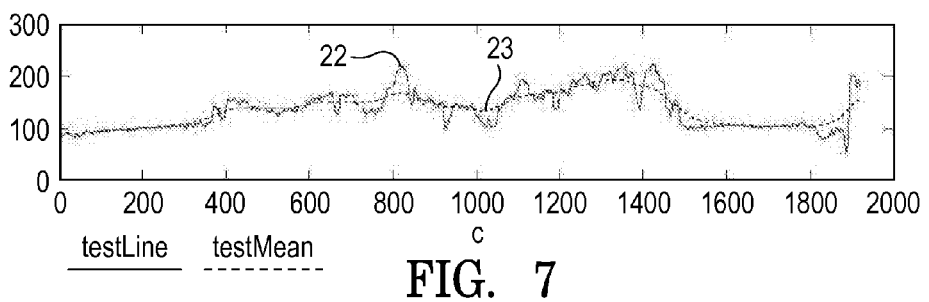
FIG. 7 is a graph of a continuously local mean of the luminance values of the right image illustrated in FIG. 4 according to embodiments of the invention.

Next, in some embodiments the resulting vertically downsampled image lines for each of the left and right images may be unsharp masked by subtracting the respective bidirectional IIR low pass filtered version from each, using bi-directional IIR filters as described in the above-referenced patent publications but using different techniques. These are illustrated in flow 100 (FIG. 3) as 106. The filter coefficients of the bi-directional IIR filter used may be a1=1−b0. This results in a generated DC (low frequency) line for each of the vertically downsampled image lines. FIGS. 6 and 7 each include two lines superimposed on a single graph. The reference line 20 of FIG. 6 is the same as reference line 20 of FIG. 4, except that FIG. 6 has a longer x-axis. The line referenced as 21 in FIG. 6 is the output of reference line 20 after being passed through the bidirectional IIR low pass filter, as described above. Similarly, the line referenced as 23 in FIG. 7 is the output of reference line 22 of FIG. 4 after being passed through the bidirectional IIR low pass filter to create a continuously local mean. Passing the data through the bidirectional IIR low pass filter effectively generates a local mean, which is noticeable in FIGS. 6 and 7 by comparing the lines 21, 23 to the respective original data lines of 20 and 22.

Next, differencing values made from modifying the left and right images are then put through the standard four correspondence measurement steps described in the Technical Report above, with some differences that further reduce computing resources while still producing effective results. The first step of the disparity measurement process in the Technical Report is referred to as "matching cost computation," in which a measurement of the spatial matching of portions of the stereoscopic images is produced. The Technical Report states that differences may be computed using an absolute value of difference, squared difference, cross-correlation, phase or wavelet phase of the left and right images. In effect, the left and right images are compared at different relative shifts, with local matching quantification results of each shift.

Figure 8:
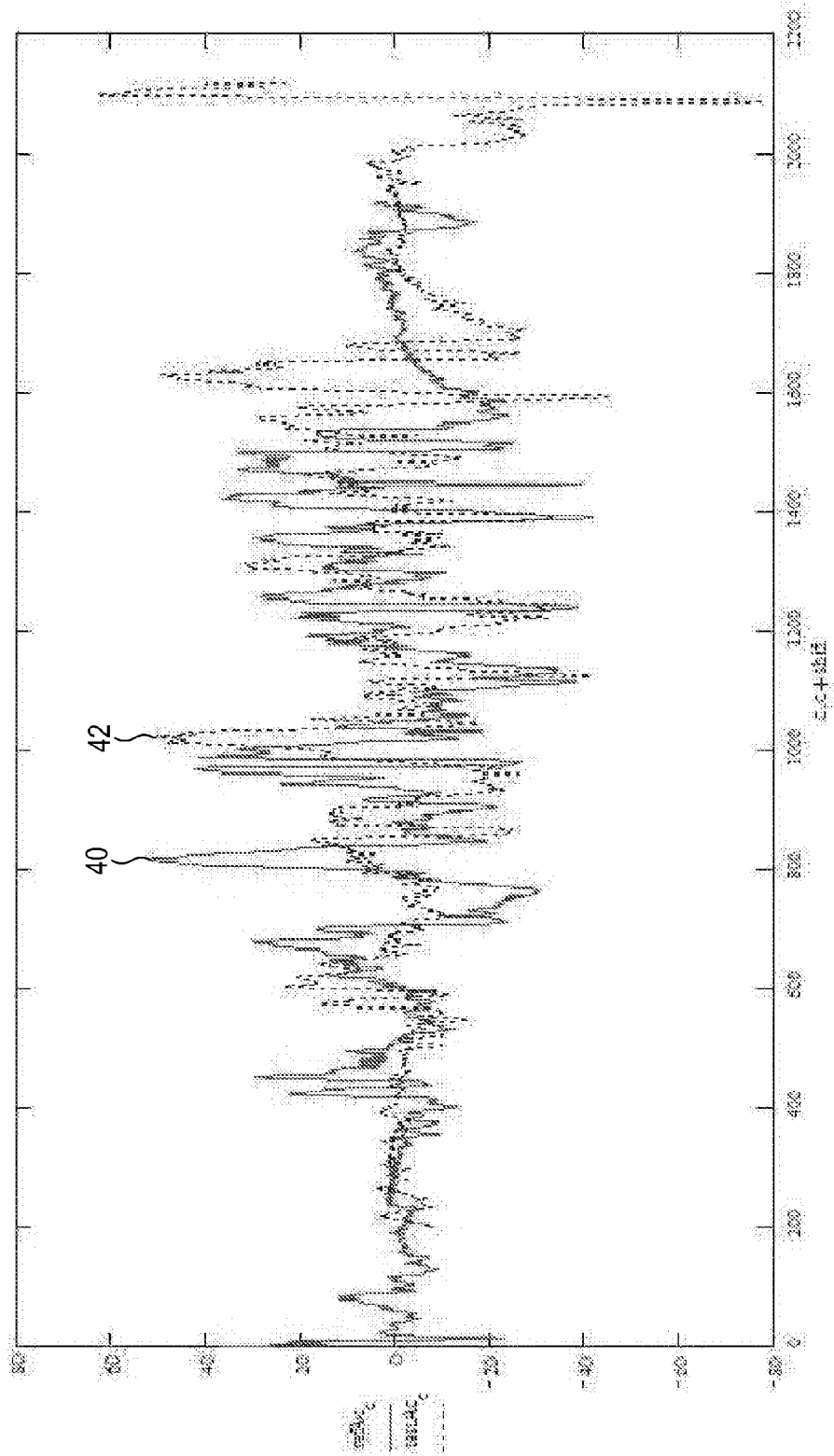
FIG. 8 is a graph of difference values created from comparing the downsampled image lines to their own local mean, for both left and right images, according to embodiments of the invention.

In embodiments of this invention, with reference to FIGS. 3 and 6, a first portion of this step is accomplished by generating a difference value between the vertically downsampled image lines and their respective local mean as shown in process 110. In other words, the original luminance values calculated for the original vertically downsampled image line (reference 20 of FIGS. 4 and 6) is compared to an IIR filtered version of the same reference (reference 21 of FIG. 6) to yield a difference value, one difference value per pixel in the line. This difference value is illustrated in FIG. 8, in which the plot 40 is the difference value for the reference lines 20 and 21, originating from the left side of the stereoscopic image of FIG. 2A, and in which the plot 42 is the difference value for the reference lines 22 and 23 of FIG. 7, originating from the right side of the stereoscopic image of FIG. 2B. These difference values that are plotted as reference lines 40 and 42 of Figure are referred to as AC (high frequency) portions of the respective signal, and are also referred to as the AC lines.

The second portion of the disparity measurement is processed in embodiments of the invention by comparing the difference values calculated in the first portion to one another. Some embodiments include another computing savings efficiency by not comparing every pixel to every other pixel, but instead skips a certain number of pixels in the lines being compared. For example, each pixel in line 40 of FIG. 8 need not be compared to all of the pixels in line 42. This is equivalent to decimation for the above-mentioned downsampling process, without the need for making new copies of the data.

The second step of calculating a correspondence in the Technical Report is aggregation of the local results from the first step. These are computed with a support region defined by a window such as square, Gaussian, and others having varying size, phrase, etc., typically using summation or FIR (Finite Impulse Response) filters.

Embodiments of the invention, exhibiting improved computational efficiency and accuracy, address the aggregation step by passing the difference values generated above through the bidirectional IIR low pass filter such as those described in the previously incorporated patent application. Thus, aggregation is accomplished by filtering in this example embodiment. The same bi-directional IIR filter coefficients for performing this filtering action may be identical to the IIR filter coefficients used above, $a1=1-b0$. This is illustrated as a process 112 of FIG. 3. The output of the low pass filter is a two-dimensional output where each column is formed of data representative of a shift value. An example output is illustrated as the data plot 200 in FIG. 9. For a 1080×1920 stereoscopic image that is downsampled into 10 horizontal bands in the process 102 of FIG. 3, ten data plots 200 are produced in the process 112, one for each vertically downsampled image line.

Figure 9:
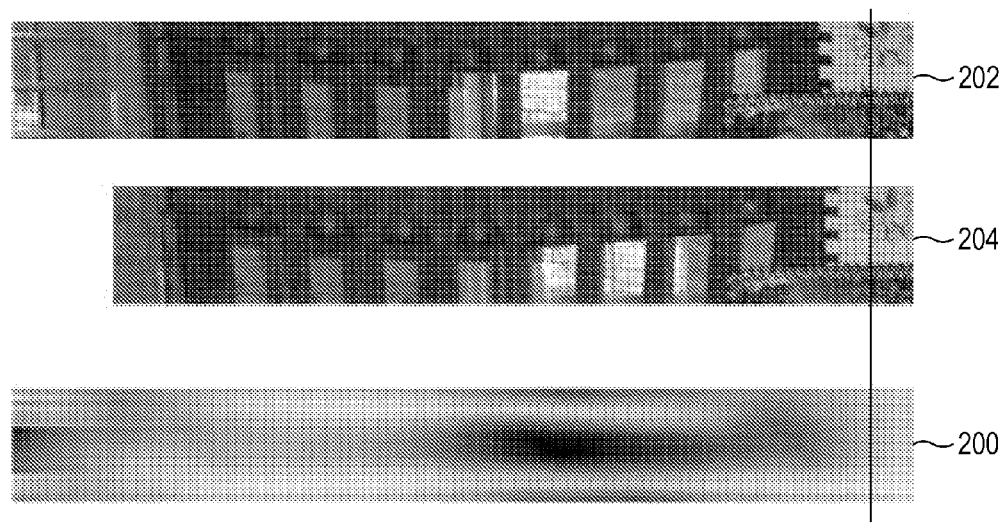
FIG. 9 is a two-dimensional data plot image illustrating an example output generated by calculating difference magnitudes of local mean unsharp masked values.

More specifically, with reference to FIG. 9, the data plot 200 is an error image that shows pixel localized error against shift values. For instance, in some embodiments the top line of the data plot 200 may be formed by taking a vertical downsampled image line for the left image and comparing it to a vertical downsampled image line for the right image. Such a comparison may be the absolute value difference of each pixel. In FIG. 9 example left and right image portions of the original stereoscopic image illustrated in FIGS. 2A and 2B are shown. These left and right image portions 202, 204 are compared to each other at a first shift value, and each pixelwise comparison is recorded as a data element of the data plot 200. As typical in comparing lines having 1920 pixels, there would be 1920−|shift| (the absolute value of the number of pixels of relative shift) comparisons for each line in the data plot 200.

The second line in the data plot is created by shifting the left and right image portions 202, 204 relative to each other by a given value. In systems where computing resources are readily available, the left and right image portions 202, 204 may only be shifted one pixel for each set of comparisons. More typical, though, would be for the pixels to shift at a larger incremental shift. After all of the desired comparisons are made, and their comparison values recorded, the data plot 200 is complete.

The third step of calculating a correspondence in the Technical Report is disparity computation/optimization. Typically this can be quickly performed by taking the best match per image portion. For example, the disparity computation may be performed per pixel if the stereo correspondence is being measured at that density. However, after all pixel shifts are calculated, the group of shifts may be evaluated for "smoothness," or discontinuities deemed unlikely in some applications. Filtering by noise, median or other filters may be used. Embodiments of the invention assume smoothness is valid for all video, and detecting non-matched regions in the stereoscopic image are more highly valued than generating the disparity value for image portions with no good match.

At this stage embodiments of the invention generate two maps or images from the data plots 200. First, for each column of the data plot 200, the minimum error value is selected and its value is coded as a pixel of a mismatch image 210, as illustrated in FIG. 11. This process appears in FIG. 3 as process 114. The top line of the mismatch image 210 is made from selecting the minimum values in each column of the first data plot 200, and is replicated an additional 107 times to compensate for the vertical downsampling process 102 (FIG. 3). That is, the first 108 lines of the mismatch image 210 are identical. This means that, in this embodiment, the mismatch image 210 and the original stereoscopic images illustrated in FIGS. 2A and 2B have the same dimensions. Similarly, the second 108 lines in the mismatch image 210 are made from a second data plot 200, which was made by comparing the left and right images in the second vertically downsampled image line to one another, as described above. Each of the data plots 200 created in the comparison process is used to make a corresponding horizontal line of the mismatch image 210. After all of the minimum error values are selected from all of the data plots 200, the values may be normalized for maximum image contrast for the mismatch image. For instance, the minimum error value of 0 may be coded to appear black on the mismatch image 210, and a maximum error value of 210, which may be the largest of the minimum values found in any column of any data plot 200, may be coded to appear white.

This mismatch image 210 serves as an indication of whether a viewer will be successful in generating the three-dimensional depth perception of the particular section of the stereoscopic image. In other words, higher levels of mismatch, which may appear as light areas, indicate that the viewer may have problems with successful fusion of the left and right images of the stereoscopic image in the viewers mind.

Also from the data plot 200 of FIG. 9, a disparity image 220 is generated, as illustrated in FIG. 12 and shown as process 116 of FIG. 3. Each pixel in the disparity image 220 represents the number of pixels that each pixel must be shifted along its horizontal line to make the minimum error determined above. In other words, differently where the mismatch image of FIG. 11 was made by taking the actual minimum comparison value in every column, the disparity image of FIG. 12 is made by plotting in the disparity image of FIG. 12 the shift corresponding to the line number of each column in which the minimum value appeared. Shifts are related to line number in this embodiment by shift=LineNumber*ShiftIncrement+InitialShift. Like the mismatch image 210, the disparity image 220 is made by replicating the line an additional 107 times. Also like the mismatch image, each horizontal line of the disparity image corresponds to a single one of the data plots 200.

Figure 10A:
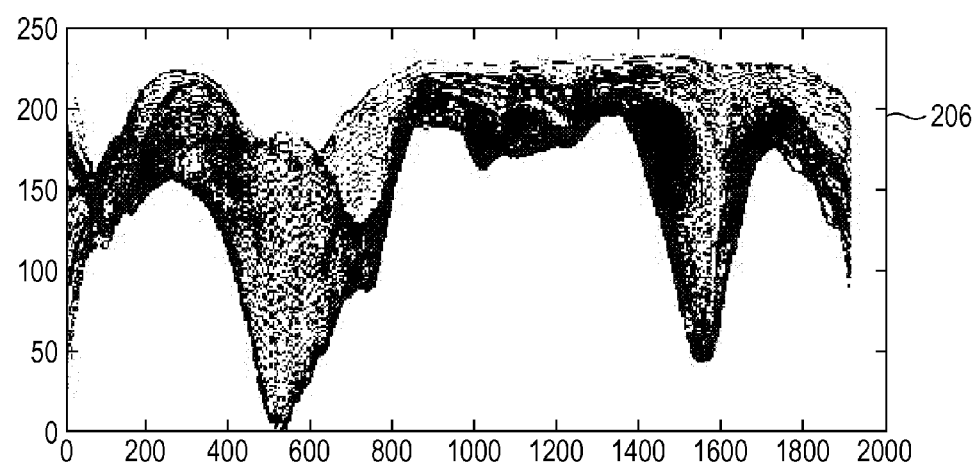
FIG. 10A is a graph illustrating measuring of matching of the data plot for the vertical sub-image illustrated in FIG. 9.
Figure 10B:
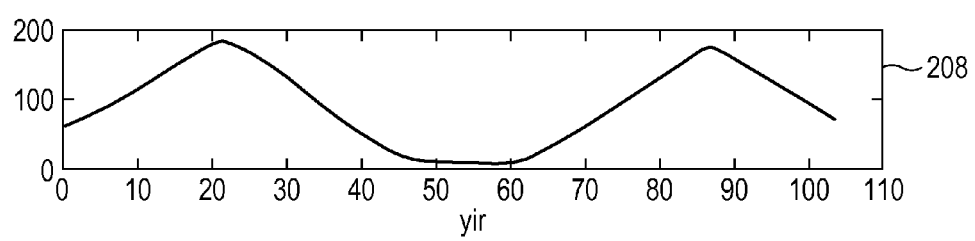
FIG. 10B is a graph illustrates the measure of matching for a particular pixel of the stereoscopic image illustrated in FIG. 9.

FIG. 10A is a graph that illustrates the measure of matching for the sub-image illustrated in FIG. 9. In this graph, the maximum values illustrate the minimum difference magnitude, which is also the compliment to the local absolute mean difference. The top curve family in FIG. 10A shows how matching curves of match (vertical) vs. pixel (horizontal) where each new curve represents a new offset (disparity) used for calculation. FIG. 10B illustrates the measure of mapping for a single pixel, the 550$^{th}$ left-most pixel of the second sub-image illustrated in FIG. 9. Again, the value graphed is the compliment to local absolute mean difference, meaning the minimum difference magnitude is shown as a maximum. There are clearly two nearly equal magnitude peaks, which may be further selected, if desired, using known methods.

The fourth step of calculating a correspondence in the Technical report is refinement of the disparity computation/optimization step (step 3). Refinement is conventionally performed by interpolating between disparity map locations, such as the disparity map 220 of FIG. 12. Embodiments of the invention perform different refinement processes.

A first option for refinement in embodiments of the invention is to perform an extended horizontal search when searching for minimum values. For instance, a threshold value may be established that must be reached in order to be a qualified minimum for the minimum selection process used to create the mismatch and disparity images in processes 120 and 130 of FIG. 3. Recall that these searches are performed in windows around the value being searched. In the extended search, a larger window is created and searched, which may include vertical as well as horizontal searching.

A second option of refinement includes performing a sub-region search. For instance, if multiple identical displacements are found when searching the data plot 200 of FIG. 9, or if the mismatch image generation process indicates a poor mismatch, then the particular vertical segment may be divided into two (each made from averaging 54 lines each, for example, instead of 108) and the process repeated until better matches are found. This may occur multiple times, if necessary, to satisfy the threshold minimums. This may occur especially if the original stereoscopic image includes multiple distinct depth planes.

A third option of refinement includes a temporally adaptive search for stereoscopic images that are a portion of a video. For video, successive frames use previous frame disparity information and differential disparity (disparity motion) to predict disparity in the current frame, which has the effect of creating better matches at the outset with less refining. More specifically, after the first left and right frames of the stereoscopic image are processed to get the shifts for matching (or mismatch) of each pixel, this information is used as a starting point for matching each pixel of the following frame. This has the benefit of being able to use a smaller search range than in systems that do not us the prediction, which, in turn, allows for a better result while simultaneously reducing computing resource needs. Ranges may be limited to those corresponding to human eye tracking rate (measured in visual degrees/second), and vergence adjustment tracking rates. Techniques other than smaller search range may also be used in conjunction with embodiments of the invention, such as object tracking, linear predictive coding, and motion compensation methods in video compression algorithms known in the prior art, for example.

Figure 13:
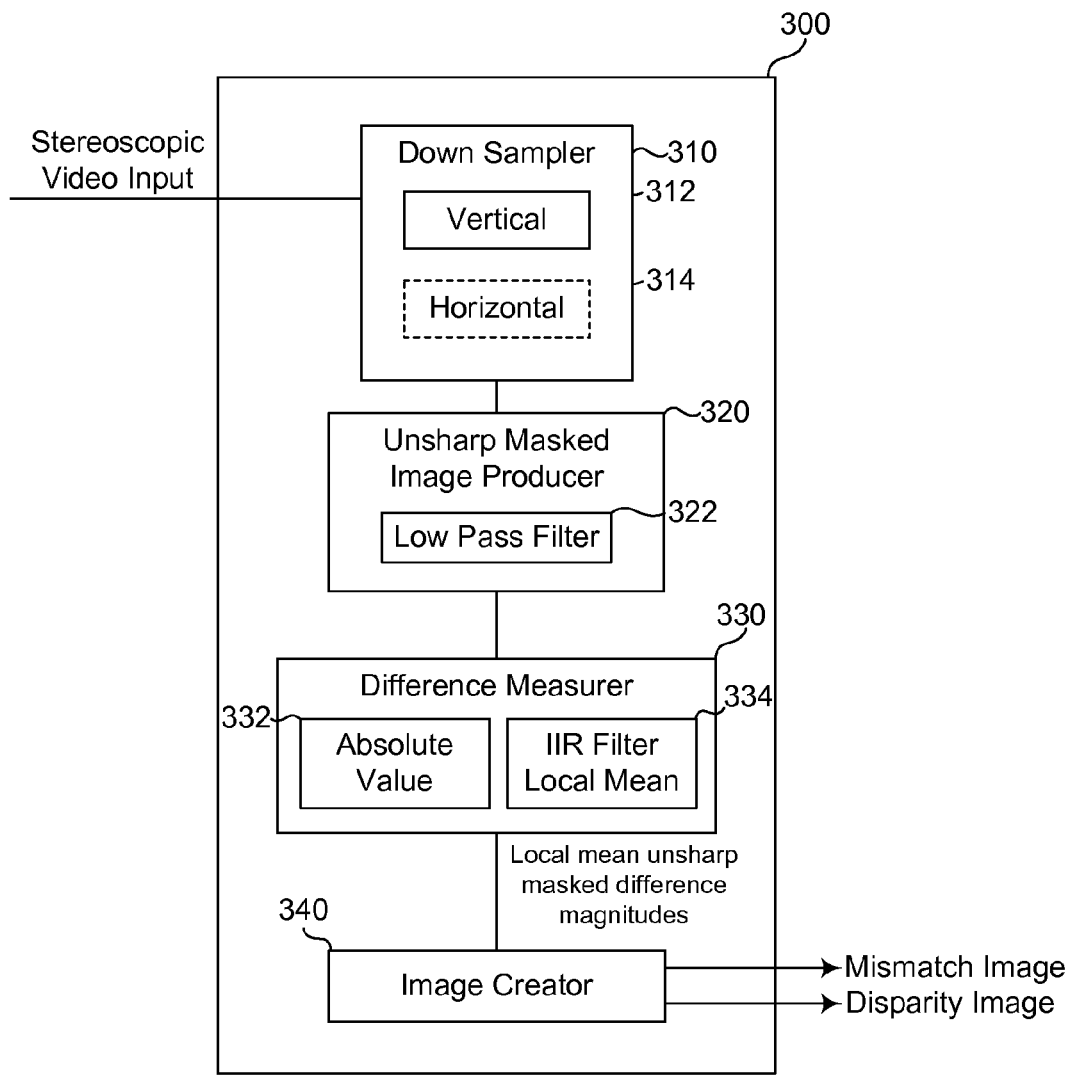
FIG. 13 is a functional block diagram illustrating an example system for performing embodiments of the invention.

FIG. 13 is a functional block diagram of an example system to efficiently measure stereoscopic disparity and make measurements of 3-D images according to embodiments of the invention. An analysis device 300 may be a stand-alone device or may be part of a larger system. The device 300 may be implemented on a general purpose computer running a commercial operating system and having the various illustrated functions embodied as software processes. These processes may be separate processes or may all be sub-components of a larger program. Alternatively, the device 300 may be formed in a programmable device, such as an FPGA (Field Programmable Gate Array), as is well known in the art. If production costs warrant, the device 300 may be embodied in an ASIC (Application Specific Integrated Circuit). Most typically, though, the analysis device 300 is formed of several of these components amalgamated into a single device. For example, an FPGA may be used for the bulk of processing, while a software routine running on general purpose computer hardware may run a menu system that allows the user to make selections for the analysis device 300 to perform. It is important to note that the details of how the processes are embodied are implementation specific and generally left to the system designer, who is well versed in all of these various implementation methods and the benefits and detriments of each.

A stereoscopic video input including left and right images is input to the analysis device 300. A downsample processor 310 is structured to perform vertical and/or horizontal downsample processing, depending on operating details. The more the stereoscopic images are downsampled, the fewer computing resources are necessary to perform analysis, but at a cost of decreased precision and accuracy. The vertical and horizontal downsampling may be dissimilar, where images are downsampled vertically much more than horizontally.

Following the downsampling, a processor 320 generates an unsharp masked image output by comparing the output of the downsample processor 310 to a low-pass filtered version of itself. As described above, the low-pass filter 322 may include an IIR bi-directional filter. The unsharp masked image output is then passed to a difference measurer 330, which performs the difference processing between the unsharp mask-processed image lines for both the left and right images at various relative shifts. The difference measurer 330 may use an absolute value measurement facility 332 as described above to make its initial difference calculation, or any of a number of variations. Then, the difference signal is passed through another process, such as another IIR low pass filter 334 to generate an output of local mean unsharp masked difference magnitudes. This output was described above as the two-dimensional data plot that is generated for each vertically downsampled image line. This data plot serves as the basis for the image creator 340, which makes both a mismatch image and a disparity image from the data plot. More specifically, both the disparity image and the mismatch images are indicative of how matched the components in the original stereoscopic image are to one another. The disparity image provides information to the viewer regarding how far each section of the images are apart relative to one another, while the mismatch image is informational regarding the actual minimum error at this spatial shift, corresponding to the amount of mismatch between left and right images. The amount of mismatch can also be a good indicator of likely visual discomfort experienced from viewing the images. These images are presented to the user as images that can be displayed or stored for analysis.

Consequently, in view of the wide variety of permutations to the embodiments described herein, this detailed description and accompanying material is intended to be illustrative only, and should not be taken as limiting the scope of the invention. What is claimed as the invention, therefore, is all such modifications as may come within the scope and spirit of the following claims and equivalents thereto.

What is claimed is:

1. A method, comprising:
  accepting a left-eye image and a right-eye image of a stereoscopic image;
  creating a set of differential data from differences between at least a portion of the left image and at least a portion of the right image by performing a set of pixelwise comparisons between the portion of the left image to the portion of the right image in which, for each pixelwise comparison, the portion of the left image and the portion of the right image are incrementally shifted relative to each other;
  generating a two-dimensional mismatch image in which each pixel of a line of the mismatch image corresponds to one of the set of pixelwise comparisons; and
  assigning a color to each pixel of the mismatch image, in which the color is indicative of a level of match of the set of differential data.

2. The method of claim 1 in which the left-eye image and the right-eye image have a height and width, and in which the set of differential data is created from a vertically downsampled version of the left-eye image and the right-eye image.

3. The method of claim 2 in which each group of data in the set of differential data corresponds to a vertically downsampled image line of the left-eye image and right-eye image.

4. The method of claim 3 in which each line of the mismatch image is vertically expanded to fill a region of the mismatch image that corresponds to the region of the stereoscopic image from which the line was created.

5. A method of generating differential data from a stereoscopic image having a left-eye image and a right-eye image, the method comprising:
vertically downsampling at least one of the left-eye image and the right-eye image into a set of downsampled image lines;
creating an unsharp mask for a downsampled image line of the set of downsampled image lines by filtering the downsampled image line with an IIR low pass filter to create a filtered downsampled image line and removing the filtered downsampled image line from the downsampled image line; and
generating a set of difference data for the downsampled image line by comparing the downsampled image line to its own unsharp mask and storing the comparison, the set of difference data comprising absolute value differences.

6. The method of claim 5, in which the at least one of the left-eye image and right-eye image is a left-eye image, the method further comprising:
vertically downsampling the right-eye image into a second set of downsampled image lines;
creating an unsharp mask for a downsampled image line of the second set of downsampled image lines by filtering the downsampled image line of the second set of downsampled image lines with the IIR low pass filter to create a second filtered downsampled image line and removing the second filtered downsampled image line from the downsampled image line of the second set of downsampled image lines;
generating a set of difference data for the downsampled image line of the second set of downsampled image lines by comparing the downsampled image line of the second set of downsampled image lines to its own unsharp mask and storing the comparison; and
performing a plurality of comparisons of the stored sets of comparison data from the left-eye image and the right-eye image to one another, in which, for each comparison, the left-eye image and the right image are incrementally shifted relative to each other.

7. The method of claim 6, in which performing a plurality of comparisons of the stored sets of comparison data to one another comprises:
quantifying a difference value between the stored sets of comparison data; and
creating a set of local mean unsharp masked difference magnitudes from the quantified difference value.

8. The method of claim 7, further comprising:
generating a mismatch image from the set of local mean unsharp masked difference magnitudes.

9. The method of claim 8, further comprising:
generating a disparity image from the set of local mean unsharp masked difference magnitudes.

10. The method of claim 5, further comprising horizontally downsampling each of the left-eye image and right-eye image into a set of downsampled image lines, or horizontally downsampling the set of downsampled image lines created by the vertical downsampling.

11. The method of claim 5 in which the IIR low pass filter has coefficients a1=1−b0.

12. The method of claim 5 in which generating a set of difference data comprises filtering the downsampled image line with a bi-directional IIR filter having coefficients a1=1−b0.

13. An image processing device, comprising:
an input for receiving a stereoscopic video including a left-eye image and a right-eye image;
a difference measurer structured to generate a set of outputs corresponding to a plurality of comparisons between the left-eye image and the right-eye image, the comparisons made at a plurality of relative shifts between the left-eye image and right-eye image; and
a mismatch image creator structured to accept the set of outputs of the difference measurer as an input, to generate a two-dimensional mismatch image, and to assign a color to each region of the mismatch image, in which each region of the mismatch image corresponds to one of the set of outputs and the assigned color is indicative of an amount of relative disparity between portions of the left-eye image and the right-eye image for one of the plurality of relative shifts.

14. The image processing device of claim 13 further comprising a downsampler structured to downsample the left-eye image and the right-eye image.

15. The image processing device of claim 14 in which the downsampler comprises a vertical downsampler having a first downsampling intensity input and a horizontal downsampler having a second downsampling intensity input.

16. The image processing device of claim 13, further comprising:
an unsharp masked video producer structured to accept the left-eye image and the right-eye image as inputs and to generate unsharp masked images as respective outputs.

17. The image processing device of claim 13 in which the unsharp masked video producer comprises a bi-directional IIR filter having coefficients a1=1−b0.

18. The image processing device of claim 13 in which the mismatch image is scaled to have the same dimensions as images of the stereoscopic video input.

19. The image processing device of claim 13, further comprising a disparity image creator structured to accept the output of the difference measurer as an input and to generate a disparity image having a plurality of image regions that are indicative of a relative disparity between portions of the left-eye image and right-eye image.

20. The image processing device of claim 19 in which the disparity image creator comprises a bi-directional IIR filter having coefficients a1=1−b0.

* * * * *